(12) United States Patent
Rosengarten (10) Patent No.: US 10,050,858 B2
(45) Date of Patent: Aug. 14, 2018

(54) SELECTIVELY RE-HOMING DATA PROCESSING TASKS BASED ON DATA COMPLEXITY AND CANDIDATE SYSTEM PERFORMANCE CHARACTERISTICS

(71) Applicant: OpenGov, Inc., Mountain View, CA (US)

(72) Inventor: Mike Rosengarten, Sunnyvale, CA (US)

(73) Assignee: OPENGOV, INC., Mountain View, CA (US)

( * ) Notice: Subject to any disclaimer, the term of this patent is extended or adjusted under 35 U.S.C. 154(b) by 202 days.

(21) Appl. No.: 14/522,320

(22) Filed: Oct. 23, 2014

(65) Prior Publication Data
US 2016/0119209 A1 Apr. 28, 2016

(51) Int. Cl.
*G06F 15/173* (2006.01)
*H04L 12/26* (2006.01)
*H04L 29/08* (2006.01)

(52) U.S. Cl.
CPC ...... *H04L 43/0817* (2013.01); *H04L 67/1008* (2013.01); *H04L 67/32* (2013.01); *H04L 67/34* (2013.01)

(58) Field of Classification Search
CPC .............. H04L 43/0805; H04L 67/101; H04L 67/1012; H04L 67/1014; H04L 67/1008; H04L 43/0817; H04L 67/34; H04L 67/16; H04L 67/32
See application file for complete search history.

(56) References Cited

U.S. PATENT DOCUMENTS

| 2003/0061225 | A1* | 3/2003 | Bowman | G06F 17/30067 |
| 2011/0173247 | A1* | 7/2011 | Hubbard | G06Q 30/02 709/203 |
| 2011/0320520 | A1* | 12/2011 | Jain | G06F 9/5072 709/203 |
| 2014/0047272 | A1* | 2/2014 | Breternitz | G06F 11/3495 714/32 |
| 2017/0031800 | A1* | 2/2017 | Shani | G06F 8/77 |

OTHER PUBLICATIONS

International Search Report and Written Opinion for corresponding International Application No. PCT/US15/056399; dated Jan. 7, 2016 (16 pages).

* cited by examiner

*Primary Examiner* — Hamza N Algibhah
*Assistant Examiner* — Anh Nguyen
(74) *Attorney, Agent, or Firm* — Patterson & Sheridan LLP (57) ABSTRACT

Techniques are disclosed for selectively re-homing data processing tasks based on data complexity and candidate system performance characteristics. A server system obtains performance capabilities of a target system such that the server can decide whether to send program code and data to the target system for execution, based in part on the complexity of the data and code used in performing the request. In cases where a client system sending a request is capable of executing code and where other constraints are satisfied, e.g., bandwidth, throughput, and data volume, then the server can decide to re-home both the data and the program code to the client for execution.

15 Claims, 8 Drawing Sheets

SELECTIVELY RE-HOMING DATA PROCESSING TASKS BASED ON DATA COMPLEXITY AND CANDIDATE SYSTEM PERFORMANCE CHARACTERISTICS

BACKGROUND

Field

Embodiments presented herein generally provide techniques for determining where to process data sets within a client server architecture. More specifically, embodiments presented herein provide approaches for selectively sending data processing tasks to a client system based on data complexity and performance characteristics of the client system.

Description of the Related Art

Client server frameworks are commonly used to perform a wide variety of computing tasks as well as to provide clients with access to a wide variety of services. Conventionally, a client system connects to a server by referring to a network location, e.g., a Uniform resource locator (URL) specifying a domain name (and optionally a resource hosted at that domain). In response, the server can perform any form of data processing to generate a response returned to the client. In simple cases, the request may simply be for static web content (e.g., a HTML document) hosted on the server. In other cases, the server can host application servers, web-services, database systems, etc., used to generate a response returned to a client.

For example, consider a financial transparency application used to provide access to financial data related to a governmental entity, e.g., a city or other municipality. In such a case, servers hosting the financial transparency application could have access to both a general ledger for a number of years along with a chart of accounts describing a financial structure of a municipality, e.g., as a set of funds, divisions, and departments. When a client requests to know how much a given division in a department has spent in a given year on something, e.g., transportation or staff salaries), the server can execute processing code that reconciles the chart of accounts and general ledger. For example, the financial transparency application may generate a data structure that associates transactions in the general ledger with the organizational structure of the municipality defined in chart of accounts. The processing code can then generate a summary returned to the client.

This approach has scalability problems as the number of requests increase as well as when the volume or complexity of data processed for each request increases. As a result, a service provider may have to deploy increasing amounts of infrastructure to meet the data processing requirements of the service. That is, client/server architectures typically do heavy data processing on the server and then send the output, often referred to as insight or summary, to the client for display. Doing so results in a heavy burden on the server resources and does not scale well as more clients access hosted services.

SUMMARY

Embodiments presented herein include a computer-implemented method for responding to a data processing request received by a first computing system. This method may generally include obtaining a data complexity score corresponding to data used to perform the data processing request, obtaining a code complexity score corresponding to one or more code components executed to perform the data processing request and determining, based on the data complexity score, code complexity score, and on performance metrics associated with a second computing system, whether to re-home the data and the one or more code components to the second computing system.

In a particular embodiment, upon determining to re-home the data and the one or more executable code components to the second computing system, the data and the one or more code components are sent to the second computing system. The second computing system executes the code components using the data to service the data processing request. Alternatively, upon determining to not re-home the data and the one or more executable code components to the second computing system, the first computing system executes the code components using the data to service the data processing request.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

DETAILED DESCRIPTION

Embodiments presented herein provide approaches for selectively sending data processing tasks to a client system based on an evaluation of code and data complexity, as well as on an evaluation of performance characteristics of the client system. In particular, embodiments presented herein provide an application architecture that can decide whether to execute processing components on a server or send the processing components, along with data, to a client for execution. For example, given a data processing component that can execute on either a client or server, the application architecture described herein evaluates the complexity of the data to be processed by the data processing component, as well as performance characteristics of a client. In some cases, the code and data is sent to the client for processing. That is, in cases where the client can efficiently execute the processing code, the client services its own request. Doing so reduces the data processing requirements on the server, which, in turn, allows the server to process more requests.

In addition to determining whether the client is capable of effectively performing the data processing, based on the performance characteristics of the client and on the data complexity, the server also evaluates whether performing the data processing on the client would result in poor overall performance. For example, in cases where the volume of data that would need to be sent to the client would result in substantial network transfer time, the application architecture can short-circuit the evaluation process and perform the data processing locally.

More generally, embodiments presented herein determine performance capabilities of a target client machine such that a server can decide whether to send program code and data to the client for execution, based in part on factors including the complexity of the data, complexity of the code used in performing the request, and volume of the data. In cases where a client system sending a request is capable of executing code and where other constraints are satisfied, examples of constraints include bandwidth, throughput, and data volume, then the server can decide to send both the data and the program code to the client.

The following description relies on a financial transparency software application as a reference example of a client/server application configured to selectively send data processing tasks to clients based on an evaluation of code and data complexity, as well as on performance characteristics of the client. However, one of ordinary skill in the art will recognize that embodiments presented herein may readily be adapted for other client/server applications. Further, one of ordinary skill in the art will recognize that embodiments may readily be adapted for other distributed computing architectures in addition to a client/server model. For example, in one embodiment, a server may distribute computing tasks among a pool of servers, based on an evaluation of code and data complexity and varying performance characteristics of servers in the pool of servers.

Figure 1:
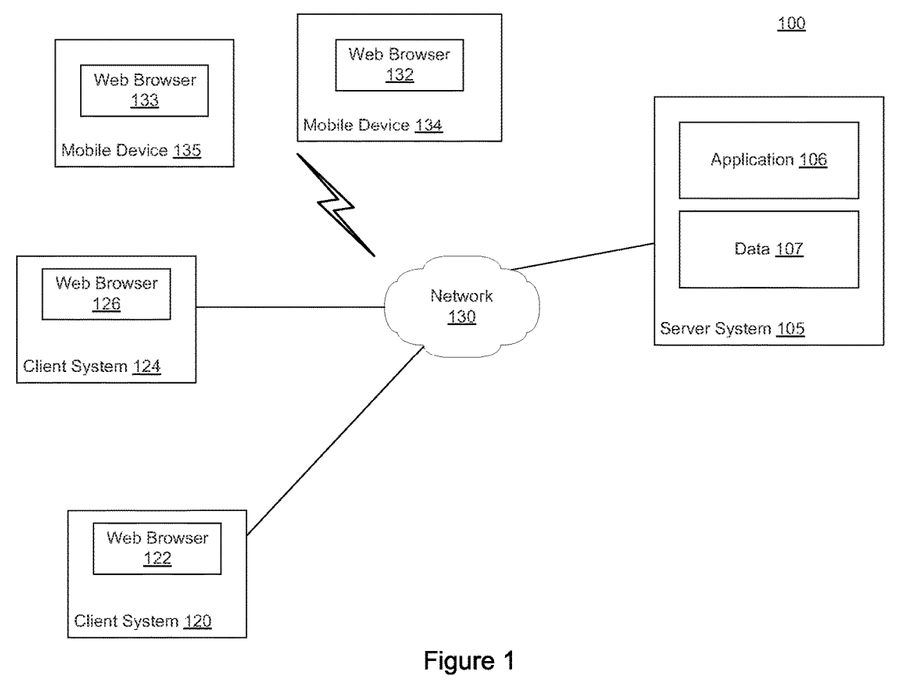
FIG. 1 illustrates an example computing environment, according to one embodiment.

FIG. 1 illustrates an example computing environment 100, according to one embodiment. As shown, the computing environment 100 includes a server 105, one or more client systems 120, 124, and one or more mobile device clients 134, 135, each connected to a network 130. The server 105 may be a physical computing system, such as a system in a data center, or a virtual computing instance executing within a computing cloud. In one embodiment, the server computer 105 hosts an application 106, such as a financial transparency application, which can provide visualizations of data 107 to a requesting client device 120, 124, 134, 135. The application 106 allows a users to access views of data 107, e.g., on a web browser 122, 126, 132, 133.

Clients systems 120, 124 generally represent a desktop or laptop computing system executing a browser 122, 126. Mobile devices 134, 135 are included to represent a variety of computing devices, such as mobile phone devices or computing tablets capable of executing a web-browser 132, 133. The web-browser accesses application 106 over network 130 such as the Internet. The application 106 may be configured to perform data processing on the server 105 and then send the output, in some cases called the "insight" or "summary," to the clients 120, 124, 134, or 135 for display. However, in one embodiment, the application 106 evaluates whether the data processing associated with a request from a given client 120, 124, 134, or 135 can be performed by the client making that request. In such cases, the application 106 sends code components to the client, such as a JavaScript application, along with the data needed to perform a given request.

For example, the application 106 may determine a measure of complexity of the data 107 needed to perform a request and, based on the complexity, determine whether the client can effectively perform the requested data processing, referred to herein as "re-homing" the data processing task. If the client can effectively perform the requested data processing, the application 106 sends code and data to the client. If not, then the application 106 performs the processing requested by the client and returns output e.g., the insight or summary. Examples of measuring the complexity of code and data and of selectively re-homing a requested processing task to a client requesting the processing are described in greater detail below.

Figure 2:
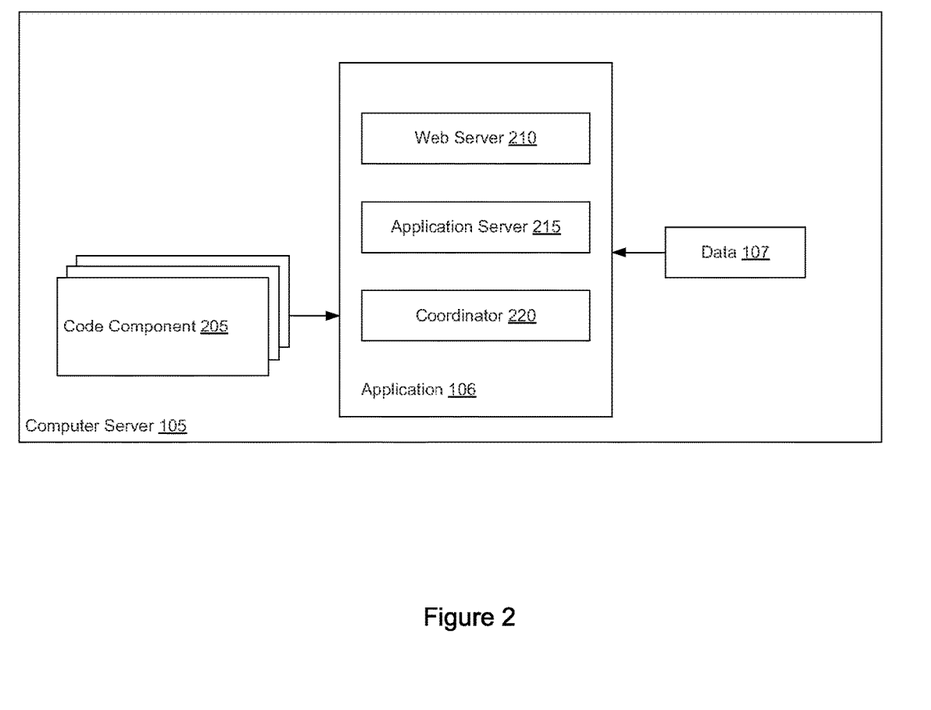
FIG. 2 illustrates an example of components on a server system used to selectively re-home data processing tasks based, in part, on data complexity, according to one embodiment.

FIG. 2 illustrates an example of components on a server 105 system used to selectively re-home data processing tasks based, in part, on data complexity, according to one embodiment. As shown, the server 105 includes the application 106, data 107, and code components 205. As further shown, the application 106 includes a web-server 210, an application server 215, and a coordinator 220. The web-server 210 is configured to respond to requests from clients. Generally, the web-server receives a request from a client, such as a request for a resource on server 105 or a request to invoke a service hosted by server 105. For example, the request may be formatted as a REST API call to invoke services hosted on the application server 215. In response, the application server 215 may execute one or more code components 205 to retrieve data 107, process the data 107 as specified in the request, and generate a response. For example, the application server 215 may generate an HTML or XML document storing the results of the data processing. In turn, the web-server 106 returns the response to the client.

In one embodiment, the coordinator 220 determines whether the processing associated with a given client request can be performed by the client making the request before performing the request on the server (e.g., by application server 215). The coordinator 220 may first determine whether the volume of data 107 or size of the code components 205 exceed a threshold size. That is, if the size of data 107 sent to the client exceeds a threshold value, then processing is performed locally on the server 105, regardless of the performance characteristics of the requesting client. The threshold value may also be set to limit a maximum time allowed for transmitting data and code components to the client. The threshold may vary relative to the bandwidth and throughput of a network connection between the server 105 and a given client.

In cases where the volume of data 107, or size of the code components 205 exceed the threshold, the coordinator 220 causes a request to be performed locally on the server 105. Otherwise, the coordinator determines whether to re-home code and data to the client. To make such a determination, the coordinator may evaluate performance metrics associated with the server 105 and the requesting client. For example, the coordinator may store a performance profile of the server 105 and send the client a benchmarking component used to capture performance characteristics of that client. In one embodiment, the coordinator 105 can store performance metrics of a given client for re-use in evaluating multiple requests from that client.

In addition, the coordinator 220 may compute a complexity measure of the data that needs to be processed to perform a given request and a complexity measure of the one or more code components 205 used to perform that request. Such a complexity measure may be one of McCabe's cyclomatic complexity, Halstead's metrics, Sneed's branching complexity metric, Card's data access complexity metric, Chapin's data complexity metric, Elshof's data flow complexity metric, McClure's decisional complexity metric, some other metric, or a combination of metrics. Depending on the measured complexity, the coordinator 220 may cause the web-server 210 to return one or more of the code components 205 and data 107 to the requesting client via web-browser 210 or cause the request to be performed locally on the server 105.

Figure 3:
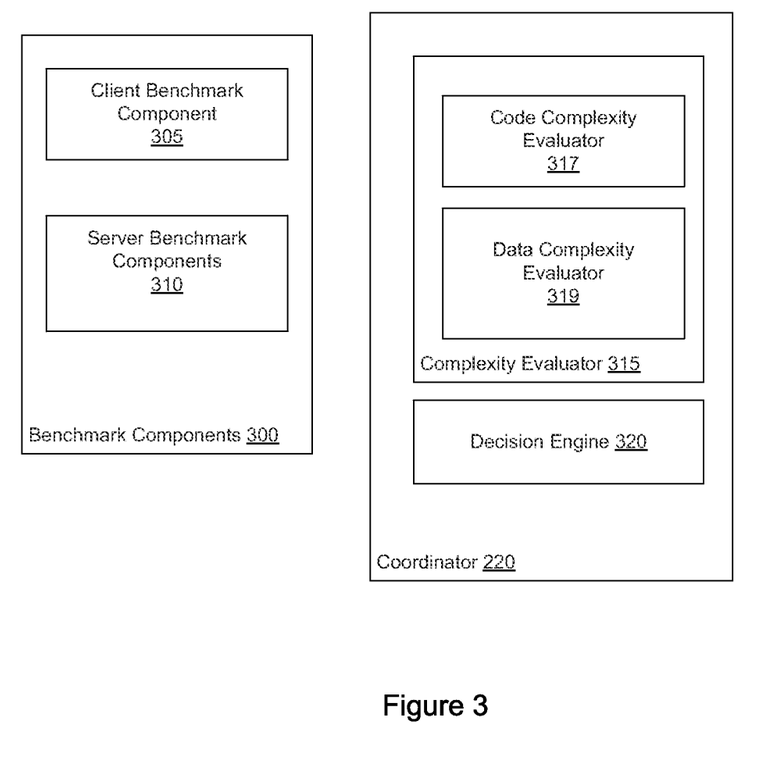
FIG. 3 illustrates an example of a coordinator component on a server system used to selectively re-home data processing tasks in a client server environment, according to one embodiment.

FIG. 3 further illustrates the coordinator 220, according to one embodiment. As shown, the coordinator 220 includes a complexity evaluator 315, and a decision engine 320. In one embodiment, the coordinator 220 may evaluate performance characteristics of the client and/or server based on results provided by the benchmark components 300. The client benchmark component 305 may evaluate any relevant metrics of a client system. For example, the client benchmark component 305 may measure performance characteristics such as a CPU/GPU performance, volatile memory capacity, nonvolatile storage capacity, memory access times, communication bandwidth, or other performance characteristics or combinations of such performance characteristics. The client benchmark component 305 may also evaluate environment capabilities, based on the JavaScript engine version, browser version, operating system, or other environment capabilities or combinations of such environment capabilities. The server benchmark component 310 may characterize the performance capabilities of a server 105 using similar criteria just discussed relative to the client benchmark component 305. In one embodiment, the coordinator 220 may decide to re-home data and code to a client based on characterized performance capabilities identified by the client benchmark component 305 and/or server benchmark component.

As shown, the complexity evaluator 315 includes a code evaluator 317 and a data evaluator 319. In one embodiment, the code evaluator 315 generates a measure of complexity for code components that can be executed on either a server or a client. The code evaluator 317 may use criteria including but not limited to any one of the following or a combination: the number of lines of code in a code component, an expected O(n) performance characteristics, expected memory requirements, a number of expected operations, or other criteria, to determine a measure of complexity for a code component. Based on the evaluation, the code evaluator 317 assigns one or more complexity scores to the code.

Similarly, the data evaluator 319 generates a measure of complexity for data that can be processed by a code component on either the server or client. The data evaluator 319 may use criteria including but not limited to any one of the following or a combination: the size of the data, the structure, sequence, or organization of the data (e.g., the number of database records, the number of columns in a database record, or the depth or amount of branching in a tree structure), or other criteria. Based on the evaluation, the data evaluator 319 assigns one or more complexity scores to the data.

The decision engine 320 provides a component of the coordinator 220 used to decide whether to respond to a request by processing data locally on the server or by sending code components and data to the client for processing. To make this decision, the decision engine 320 compares the scores of complexity assigned by the code evaluator 317 and the data evaluator 319 as well as the performance benchmarks assigned by the client benchmark component 305 and the server benchmark component 310. In one embodiment, when a client initiates a connection with server 105 and submits a request, the decision engine 220 determines if any minimum criteria are satisfied to determine whether to re-home code and data to the client for processing. The minimum thresholds may include such criteria as bandwidth, throughput, whether the client hosts an environment that supports execution of the code (e.g., as identified in a user-agent field of an HTTP request header). If the client does not satisfy some minimum requirements, then the decision engine 320 directs the request to be processed on the server 105.

If the client satisfies any minimum requirements, the coordinator 220 sends the client benchmark component 305 to the client. In response, the client replies with performance metric testing results. Once received, the decision engine 320 determines whether to send the client code and data for processing or to perform the processing locally on the server and send summary insights, depending on whether the client is an optimal processing machine to process the request submitted by that client.

Figure 4:
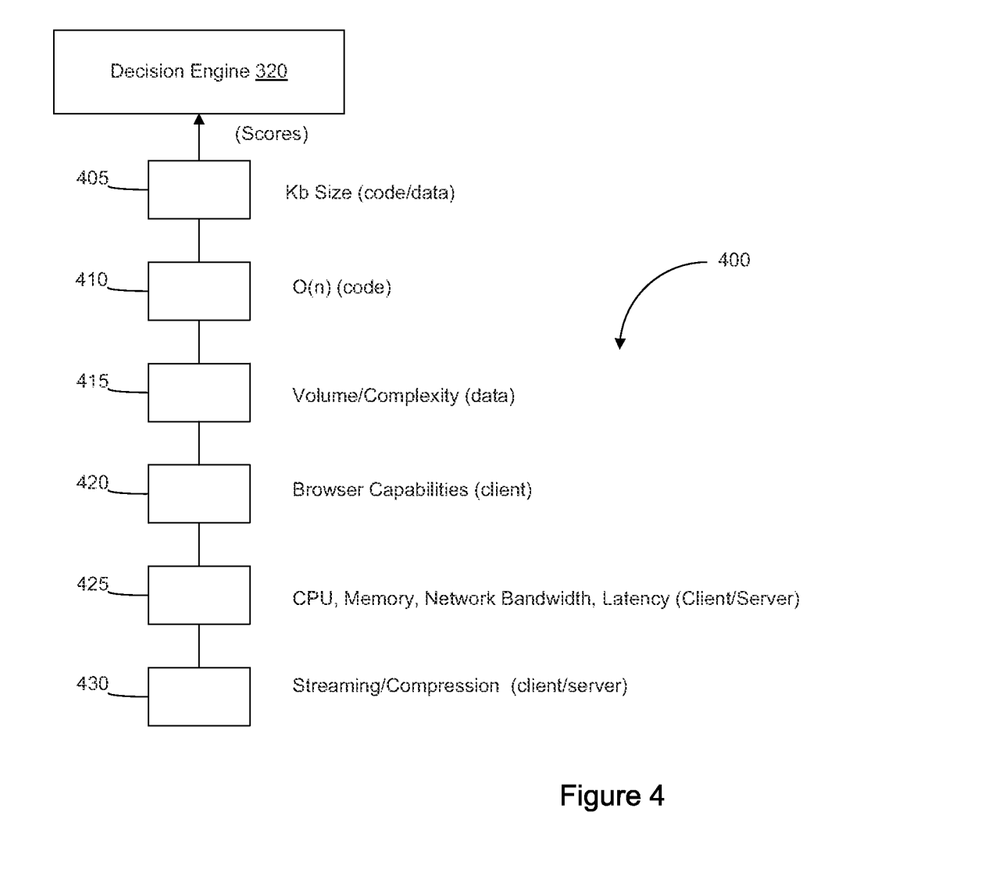
FIG. 4 illustrates an example of metrics evaluated in determining whether to re-home data processing tasks in a client server environment, according to one embodiment.

FIG. 4 illustrates an example of metrics evaluated in determining whether to re-home data processing tasks in a client server environment, according to one embodiment. As shown, the decision engine 320 receives a series of complexity and performance scores 400. Each scored 400 can be related to complexity of data or code that can be executed on either the client or the server, i.e., scores related to code and data that can be re-homed to a client. In this example, complexity score 405 corresponds to a kilobyte size of the code and data used to respond to a given request. Score 410 corresponds to a "big-O" O(n) algorithmic complexity of the processing code. Should either the size of the code or data exceed a maximum threshold then the decision engine 320 can direct a request to be processed locally on a server. Similarly, score 420 corresponds to browser capabilities of a client system. In cases where the browser may not be configured or capable of executing the processing code, than regardless of complexity or size, the decision engine 320 can direct a request to be processed locally on a server.

Otherwise, if the maximum size for code/data and minimum client capabilities are satisfied as determined from scores 405, 410, and 420, then the client is a candidate for re-homing code and data for a request from that client. That is, the decision engine 320 determines whether the client should service its own request. To do so, the decision engine 320 may evaluate the volume and of data 415 related to a given request and the performance benchmarks supplied by the client, represented in FIG. 4 as score 425, to determine whether to send code and data to the client for processing the client's own request. In addition to the performance metrics of the client, i.e., 425, the decision engine can also consider other relevant information. For example, the decision engine 320 may consider whether data for a request can be streamed while it is being processed or whether the data is (or can be) compressed and efficiently decompressed by the client, represented in FIG. 4 as score 430. Of course, one of ordinary skill in the art will recognize that the scores 400, the order in which such scores are evaluated by the decision engine 320, and the thresholds or values used to determine whether to perform a request locally on the server or to re-home code and data to a requesting client may each be tailored to suit the needs of an individual case.

Figure 5A:
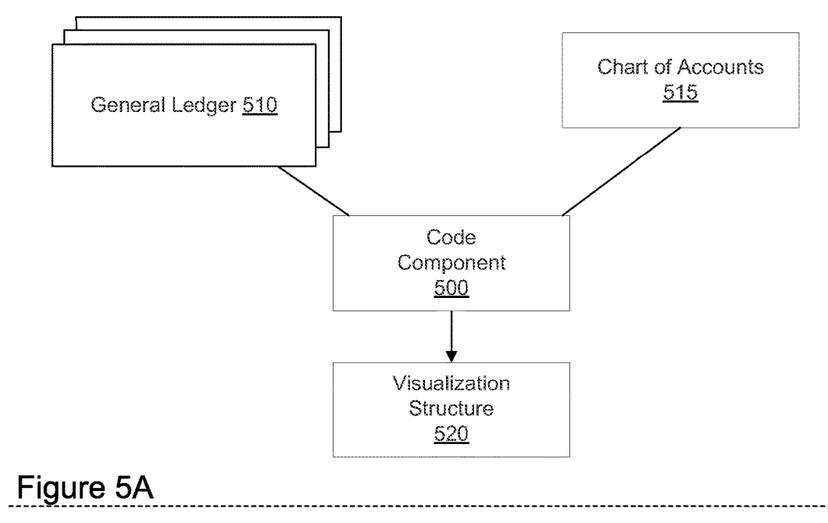
FIGS. 5A and 5B illustrate an example of processing components and data used by a financial transparency application, according to one embodiment.
Figure 5B:
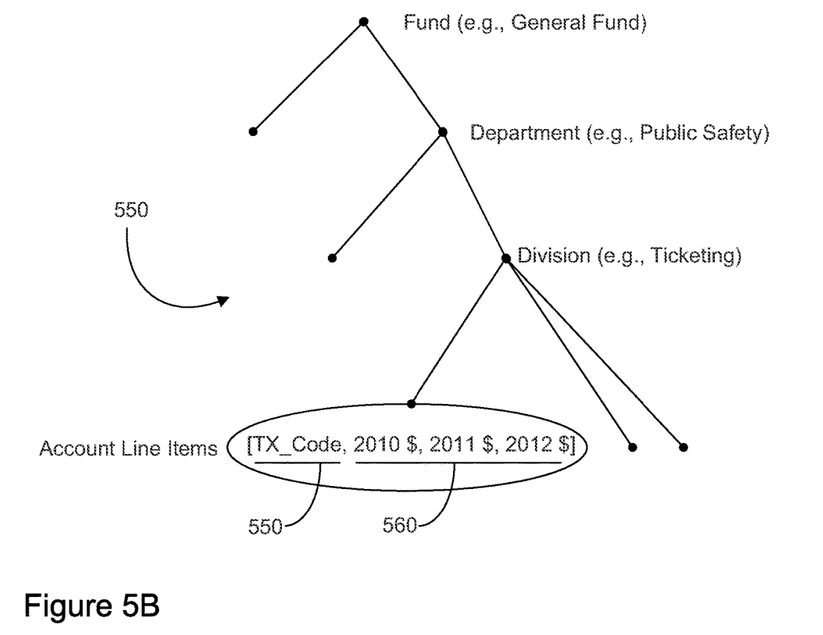

FIGS. 5A and 5B illustrate an example of processing components and data which can be selectively re-homed, according to one embodiment. In particular, FIGS. 5A and 5B illustrate a financial transparency application that can generate data visualizations of financial records stored in a general ledger. As shown in FIG. 5A, a code component 500 receives a set of general ledgers 510 and a chart of accounts 515. From this input data, the code component 500 generates a visualization structure 520.

In this example, assume the code component 500 is used by a financial transparency application to provide general access to the financial accounts of a municipal or state entity. In such a case, the general ledgers 510 may each listing the financial transactions occurring in a given year and the chart of accounts 515 describes the organizational structure of the municipal or state entity. For example, the finances of a city may be organized using an overall general fund, accessed by departments, where each department has a set of divisions. In such a case, each transaction in general ledgers 510 may be associated with a given division (and department) and provide a credit/debit to a given account or fund. In turn, funds in one division may be associated with a department fund, itself associated with the general fund. The general ledgers 510 and chart of accounts provide the raw data used to generate visualization structure 520 by the code component 500.

The visualization structure 520 presents the raw data from the general ledgers 510 and the information available to the public at large in a meaningful way. In one embodiment, the visualization structure may be generated as a tree structure which corresponds to the chart of accounts 515. In addition, each leaf node of the tree may identify the amount of spending, per year, for a given transaction. FIG. 5B shows an example of a tree structure 550 generated from a set of general ledgers 510 and chart of accounts 515. In this example, the root of the tree represents a city's general fund. From the root, one branch corresponds to a public safety department, which itself includes a "ticketing" division. For the "ticketing" division, each leaf node of tree structure 550 stores an annual amount of credits (or debits) listed in the general ledger for a particular transaction type. For example, assume tx_code 555 corresponds to entries in the general ledger 510 representing a debit a debit for fuel. In such a case, the amounts 560 show how much the 'ticketing division spent on fuel in the years 2010, 2011, and 2012. As the tree structure 550 stores amounts for each transaction for each year, generating a visualization comparing years or comparing amounts of credits or debits for different transactions can be performed by parsing the tree structure 550.

In one embodiment, the code component 500 of FIG. 5A can be executed by either a client or a server. Whether a given request should be processed by the client or the server may generally depend on the complexity of the raw data, i.e., the complexity the general ledger 510 and the cart of accounts 515. For example, even if the size of the general ledgers 510 and chart of accounts allow this data to be transmitted to the client efficiently, the complexity of reconciling the chart of accounts 515 against the transactions of the general ledger 510 may make it impractical to perform this processing on the client. In such cases, the server builds the visualization structure 520, e.g. tree 550, which is transmitted to the client. Alternatively, when the coordinator determines that the client can efficiently build the visualization structure 520, the coordinator sends the general ledgers 510 and the cart of accounts 515 to the client along with the code component 500. In such cases, the client builds the visualization structure 520 directly.

Figure 6:
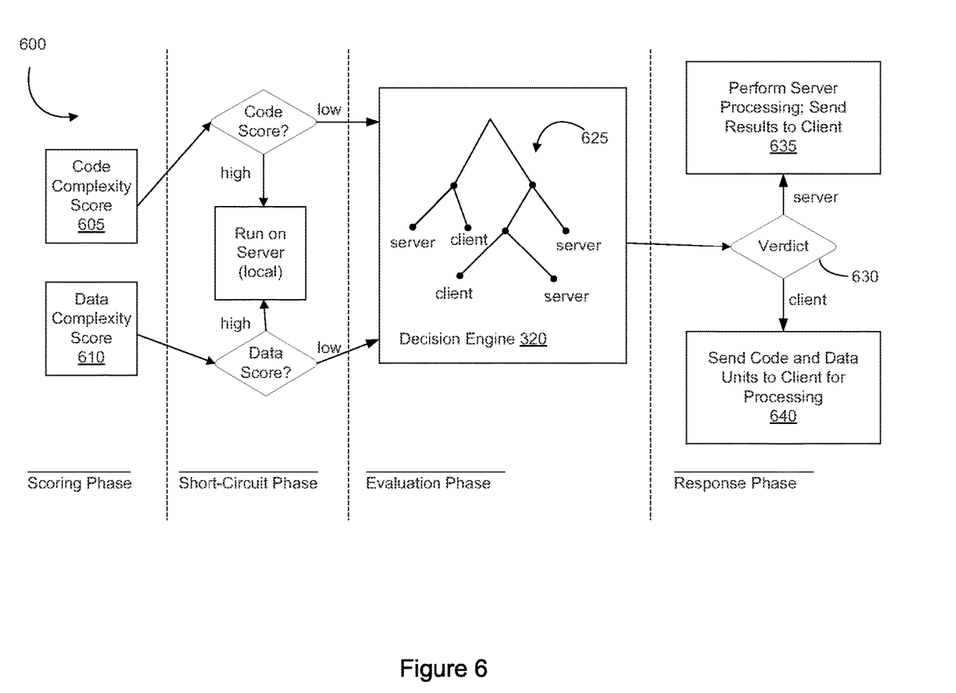
FIG. 6 is a sequence diagram illustrating an approach for selectively re-homing data processing tasks in a client server environment, according to one embodiment.

FIG. 6 illustrates an overall process of the coordinator selectively determining when to send code and data to a client. More specifically, FIG. 6 is a diagram illustrating an approach for selectively re-homing data processing tasks in a client server environment, according to one embodiment. As shown, the process 600 begins in a scoring phase where the coordinator determines both a code complexity scored 605 and a data complicity score 610.

Once determined, if either the code complexity score or the data complexity score exceeds a threshold, then the coordinator determines the request should be processed on a server, shown in FIG. 6 as part of a short-circuit phase. Otherwise, the request is a candidate for being re-homed to the requesting client. In such a case, the decision engine 320 may compare code and data complexity against performance characteristics of the client to decide whether to re-home the code and data. As part of an evaluation phase, the decision engine 320 may use the complexity and performance scores to traverse a decision tree 625 until reaching an endpoint identifying whether the processing of a request should be performed by the server or re-homed to a client.

Lastly, as part of a response phase, the coordinator uses the verdict 630 issued by the decision engine 320 to either perform server processing (at 635) and return insights or summaries to the client or to send code and data units to the client for processing (at 640).

Figure 7:
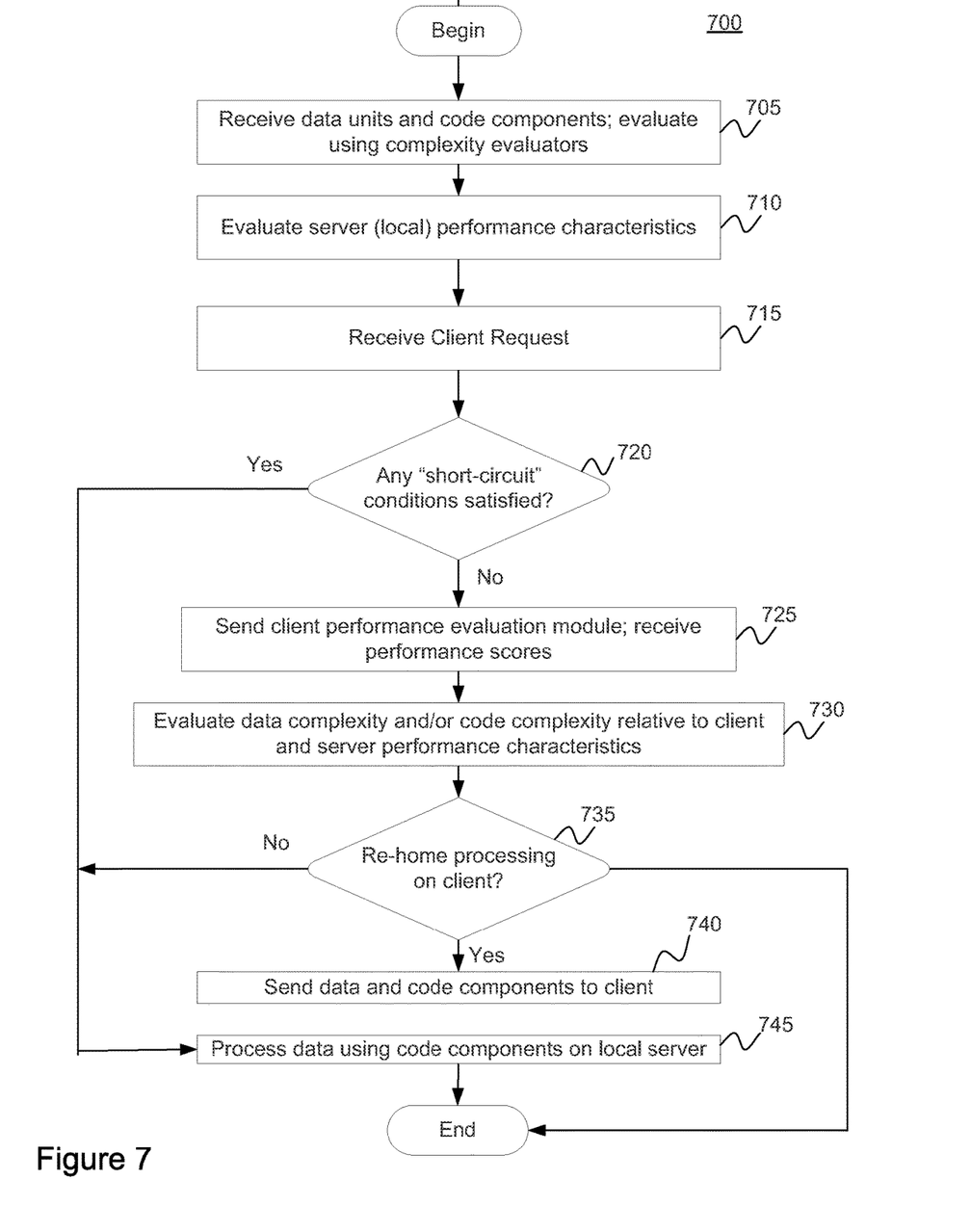
FIG. 7 illustrates a method for selectively re-homing data processing tasks based on data complexity and candidate system performance characteristics, according to one embodiment.

FIG. 7 illustrates a method 700 for selectively re-homing data processing tasks based on data complexity and candidate system performance characteristics, according to one embodiment. As shown, the method 700 begins at step 705, where a coordinator application receives data units and code components related to a hosted application, such as the financial transparency application described above. The coordinator evaluates the code and data units using complexity evaluators, as described above. Note, in one embodiment, the evaluation of the code components can be performed and the results cached prior to receiving a client request. At step 710, the coordinator evaluates server performance characteristics. Like the code components, the evaluation of the server performance characteristics components can be performed and the results and cached prior to receiving a client request.

At step 715, a client initiates a connection to the server and sends a request for data processing. For example, the server may host a financial transparency application and receive client requests for access to the financial data of a city stored on the server. In one embodiment, the coordinator may determine if any minimum criteria are satisfied before considering whether to re-home code and data to the client for processing (step 720). For example, an upper size limit may be set on the volume of data that may be re-homed based on the available bandwidth and throughput of the connection between the client and server. Similarly, the server may also evaluate any known environment capabilities of the client identified in the request, e.g., JavaScript engine version, browser version, operating system, etc., to determine whether any preconditions are not satisfied by the client sending the request. If any such "short-circuit" conditions are satisfied, then the coordinator sends the request to the hosted application on the server, which performs the requested processing and sends a summary or response to the client (step 745).

Otherwise, at step 725, the coordinator may send a performance benchmark component to the client and, in response, receive performance scores. At step 730, a decision engine on the coordinator may evaluate the code complexity score, data complexity score, performance scores of the client and server performance characteristics to determine whether to re-home processing of the client request received at step 715 to the client sending that request. As noted, the coordinator may traverse a decision tree until reaching a verdict on whether to re-home the processing of the request. If the decision engine issues verdict to re-home the processing of the client request, the coordinator causes the application server to send data and code components to the client (step 740). Otherwise, the coordinator sends the request to the hosted application on the server, which performs the requested processing and sends a summary or response to the client (step 745).

Figure 8:
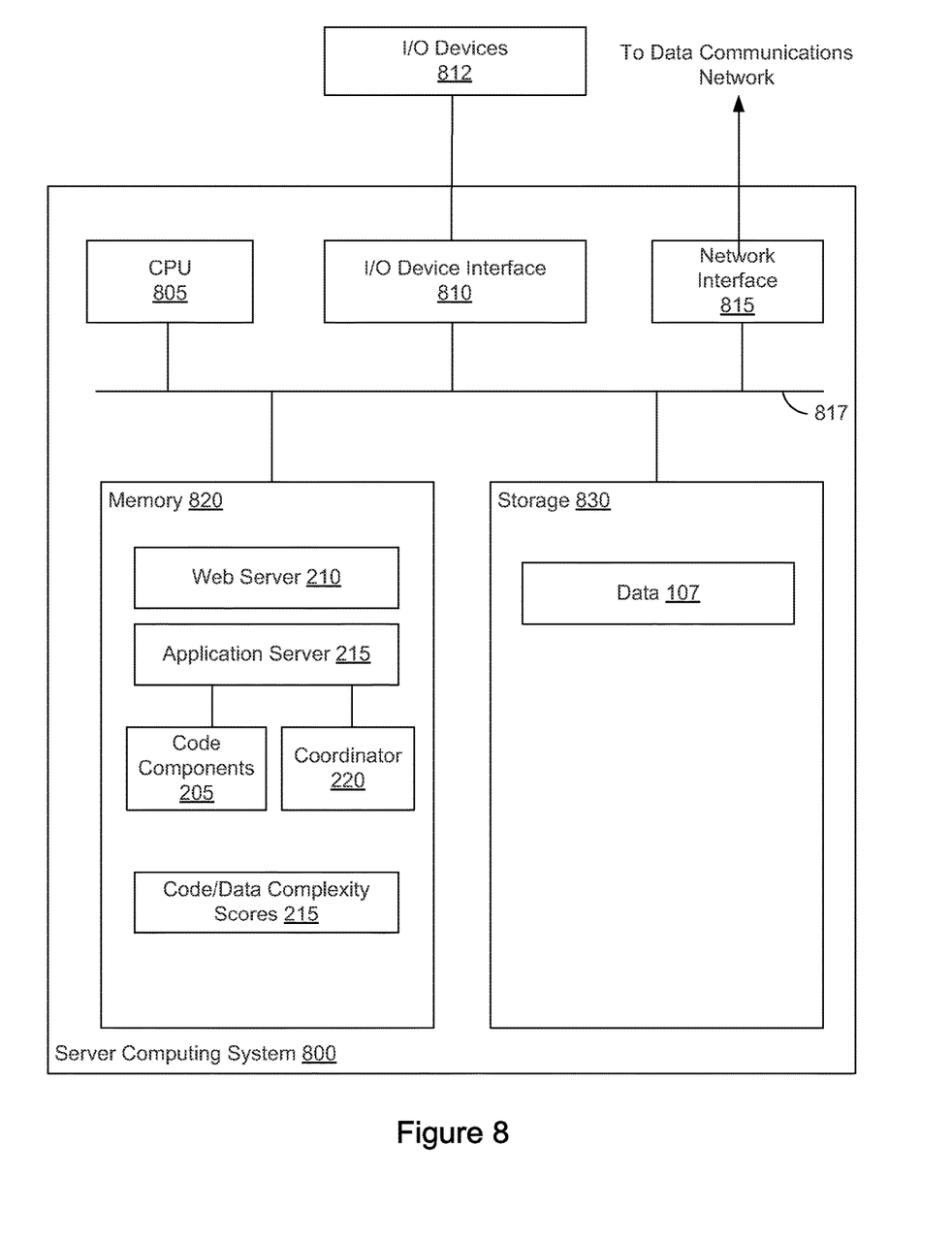
FIG. 8 illustrates an example server computing system with an application configured to selectively re-home data processing tasks, according to one embodiment.

FIG. 8 illustrates an example server computing system 800 with an application capable of selectively re-homing data processing tasks, according to one embodiment. As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812, such as a keyboard, display and mouse devices to the computing system 800. Further, in context of this disclosure, the computing elements shown in computing system 800 may correspond to a physical computing system (e.g., a system in a data center) or may be a virtual computing instance executing within a computing cloud.

The CPU 805 retrieves and executes programming instructions stored in the memory 820 as well as stores and retrieves application data residing in the storage 830. The interconnect 817 is used to transmit programming instructions and application data between the CPU 805, I/O devices interface 810, storage 830, network interface 815, and memory 820. Note, CPU 805 is included to be representative of a single CPU, multiple CPUs, a single CPU having multiple processing cores, and the like. And the memory 820 is generally included to be representative of a random access memory. The storage 830 may be a disk drive storage device. Although shown as a single unit, the storage 830 may be a combination of fixed and/or removable storage devices, such as fixed disc drives, removable memory cards, or optical storage, network attached storage (NAS), or a storage area-network (SAN).

Illustratively, the memory 820 includes the web-server 210, application server 215, code components 205, coordinator 220 and complexity scores 400. As discussed above, the coordinator 220 evaluates client requests received via the web-server 210. Based on the evaluation, the coordinator 220 decides whether a given request should be processed locally by the application server 215 or whether the code components 205 and data 107 needed to respond to a request may be efficiently re-homed to the requesting client (or other computing system).

As described, embodiments presented herein determine performance capabilities of a target client machine such that a server can decide whether to execute program code or re-home the program code to a client for execution. This approach allows the server to decide whether to send raw data to the client and execute code on the client or to keep data local and execute code on the server. That is, in cases where a target machine is capable of executing code and other constraints are satisfied, e.g., bandwidth, throughput, and data volume, then the server can decide to send both the data and the program code to the client, which then processes the data directly.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture, e.g., servers, storage, networks, enabling convenient, on-demand network access to a shared pool of configurable computing resources that can be rapidly provisioned and released with minimal management effort or service provider interaction. Thus, cloud computing allows a user to access virtual computing resources, e.g., storage, data, applications, and even complete virtualized computing systems in "the cloud," without regard for the underlying physical systems, or locations of those systems, used to provide the computing resources. A user can access any of the resources that reside in the cloud at any time, and from anywhere across the Internet. In context of the present disclosure, an application hosted on a cloud-based server may be configured to selectively send code components and data to clients after determining a client can efficiently execute the processing code. That is, the cloud-based server could send code and data needed to allow a client to service its own request. Doing so reduces the data processing requirements on the server, which, in turn, allows the server to process more requests and reduce the number of deployed instances of cloud-based servers required to effectively host a given service.

While the foregoing is directed to embodiments of the present invention, other and further embodiments of the invention may be devised without departing from the basic scope thereof, and the scope thereof is determined by the claims that follow.

What is claimed is:

1. A computer-implemented method for responding to a data processing request received by a first computing system, the method comprising:
   receiving, from a second computing system, the data processing request;
   obtaining a data complexity score assigned to data to be processed in response to the data processing request, wherein the data complexity score is computed by the first computing system based on at least one of: the size of the data; the structure of the data; the sequence of the data; and the organization of the data;
   obtaining a code complexity score assigned to one or more code components executed to perform the data processing request, wherein the code complexity score is computed by the first computing system based on at least one of: the number of lines of code in the one or more code components; an expected O(n) performance of the one or more code components; expected memory requirements of the one or more code components; and a number of expected operations of the one or more code components;
   determining, based on the data complexity score, code complexity score, and on performance metrics associated with the second computing system, whether to re-home the data and the one or more code components to the second computing system; and
   upon determining to re-home the data and the one or more executable code components to the second computing system, sending the data and the one or more code components to the second computing system, wherein the second computing system executes the code components using the data to service the data processing request.

2. The method of claim 1, further comprising upon determining to not re-home the data and the one or more executable code components to the second computing system, executing, by the first computing system, the code components using the data to service the data processing request.

3. The method of claim 1, further comprising, determining that one or more preconditions for re-homing the data and the one or more code components to the second computing system are satisfied.

4. The method of claim 1, further comprising, sending a performance benchmark component to the second computing system, wherein the performance benchmark component is configured to generate the performance metrics associated with the second computing system.

5. The method of claim 1, wherein the data comprises a chart of accounts and one or more general ledgers.

6. A non-transitory computer-readable storage medium storing instructions, which, when executed on a processor, performs an operation for responding to a data processing request received by a first computing system, the operation comprising:
   receiving, from a second computing system, the data processing request;
   obtaining a data complexity score assigned to data to be processed in response to the data processing request, wherein the data complexity score is computed by the first computing system based on at least one of: the size of the data; the structure of the data; the sequence of the data; and the organization of the data;
   obtaining a code complexity score assigned to one or more code components executed to perform the data processing request, wherein the code complexity score is computed by the first computing system based on at least one of: the number of lines of code in the one or more code components; an expected O(n) performance of the one or more code components; expected memory requirements of the one or more code components; and a number of expected operations of the one or more code components;
   determining, based on the data complexity score, code complexity score, and on performance metrics associated with a second computing system, whether to re-home the data and the one or more code components to the second computing system, and upon determining to re-home the data and the one or more executable code components to the second computing system, sending the data and the one or more code components to the second computing system, wherein the second computing system executes the code components using the data to service the data processing request.

7. The non-transitory computer-readable storage medium of claim 6, wherein the operation further comprises upon determining to not re-home the data and the one or more executable code components to the second computing system, executing, by the first computing system, the code components using the data to service the data processing request.

8. The non-transitory computer-readable storage medium of claim 6, wherein the operation further comprises, determining that one or more preconditions for re-homing the data and the one or more code components to the second computing system are satisfied.

9. The non-transitory computer-readable storage medium of claim 6, wherein the operation further comprises, sending a performance benchmark component to the second computing system, wherein the performance benchmark component is configured to generate the performance metrics associated with the second computing system.

10. The non-transitory computer-readable storage medium of claim 6, wherein the data comprises a chart of accounts and one or more general ledgers.

11. A system, comprising:
   a processor; and
   a memory hosting an application, which, when executed on the processor, performs an operation for an operation for responding to a data processing request received by a first computing system, the operation comprising:
      receiving, from a second computing system, the data processing request,
      obtaining a data complexity score assigned to data to be processed in response to the data processing request, wherein the data complexity score is computed by the first computing system based on at least one of: the size of the data; the structure of the data; the sequence of the data; and the organization of the data,
      obtaining a code complexity score assigned to one or more code components executed to perform the data processing request, wherein the code complexity score is computed by the first computing system based on at least one of: the number of lines of code in the one or more code components; an expected $O(n)$ performance of the one or more code components; expected memory requirements of the one or more code components; and a number of expected operations of the one or more code components, and
      determining, based on the data complexity score, code complexity score, and on performance metrics associated with a second computing system, whether to re-home the data and the one or more code components to the second computing system, and
      upon determining to re-home the data and the one or more executable code components to the second computing system, sending the data and the one or more code components to the second computing system, wherein the second computing system executes the code components using the data to service the data processing request.

12. The system of claim 11, wherein the operation further comprises, upon determining to not re-home the data and the one or more executable code components to the second computing system, executing, by the first computing system, the code components using the data to service the data processing request.

13. The system of claim 11, wherein the operation further comprises, determining that one or more preconditions for re-homing the data and the one or more code components to the second computing system are satisfied.

14. The system of claim 11, wherein the operation further comprises, sending a performance benchmark component to the second computing system, wherein the performance benchmark component is configured to generate the performance metrics associated with the second computing system.

15. The system of claim 11, wherein the data comprises a chart of accounts and one or more general ledgers.

* * * * *